United States Patent [19]

Albertini et al.

[11] Patent Number: 4,517,913

[45] Date of Patent: May 21, 1985

[54] MOORING SYSTEM WITH FRANGIBLE LINKS

[75] Inventors: Rocco D. Albertini, Concordville; Thomas V. Grzeczkowski, Ridley Park, both of Pa.

[73] Assignee: Baldt Incorporated, Chester, Pa.

[21] Appl. No.: 576,953

[22] Filed: Feb. 3, 1984

[51] Int. Cl.³ ............................................ B63B 21/50
[52] U.S. Cl. ...................................... 114/293; 59/84; 59/85; 114/230; 114/294
[58] Field of Search ............... 114/293, 294, 230, 265, 114/221 A, 213, 217; 59/84-90, 93

[56] References Cited

U.S. PATENT DOCUMENTS

| | | | |
|---|---|---|---|
| 2,347,088 | 4/1944 | Dock | 59/85 |
| 3,077,114 | 2/1963 | Murr | 114/217 X |
| 3,905,190 | 9/1975 | Pearlman | 55/93 |
| 4,033,277 | 7/1977 | Schaper | 114/230 |
| 4,067,282 | 1/1978 | Guinn et al. | 114/230 |
| 4,352,382 | 10/1982 | Weidler | 59/93 X |

OTHER PUBLICATIONS

"Balt Anchor/Mooring Systems for Drilling Rigs", Baldt Incorporated, Chester, Pa., 1978.

*Primary Examiner*—Sherman D. Basinger
*Attorney, Agent, or Firm*—Cushman, Darby & Cushman

[57] ABSTRACT

A semi-submersible drilling rig having a plurality of chain lockers, a plurality of anchor windlass assemblies and a plurality of fairlead assemblies, a plurality of lengths of chain each having a multiplicity of interconnected links configured to move from a chain locker in cooperative relation through an associated anchor windless assembly and an associated fairlead assembly and an anchor for each length of chain connected to the end of the associated length of chain outboard of the associated fairlead assembly so as to engage with the water bottom. Each length of chain has at least one frangible link normally disposed within the associated chain locker inboard of the associated anchor windlass and fairlead assemblies of a different construction with respect to the remaining links of the associated length of chain. Each frangible link includes frangible portions operable to be tensioned when the frangible link is moved outboard of the associated anchor windlass and fairlead assemblies and a predetermined emergency load is imposed thereon. The frangible portions have precision configured cross-sections calibrated to separate by material failure when the predetermined emergency load is imposed thereon. The remaining links of each length of chain have a strength sufficient to withstand without failure loads imposed thereon greatly in excess of the predetermined emergency load.

19 Claims, 5 Drawing Figures

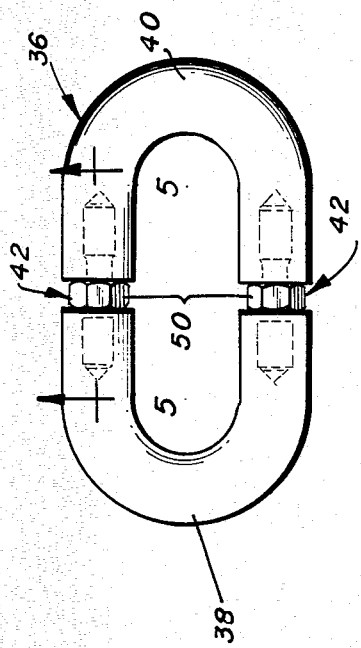
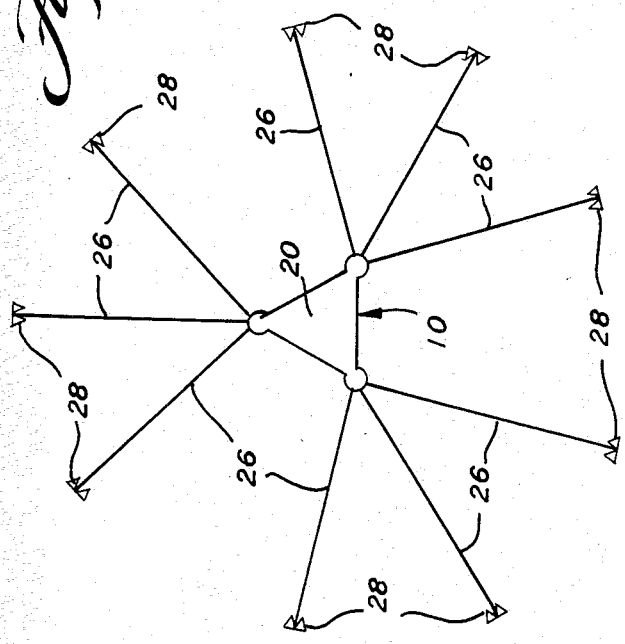
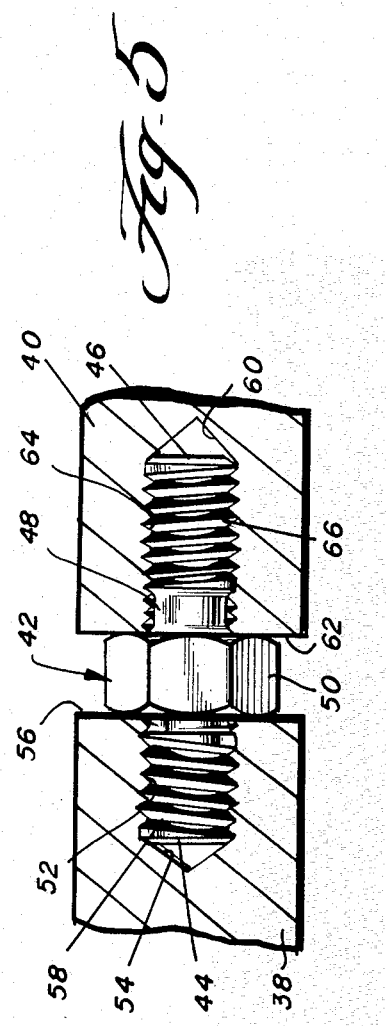

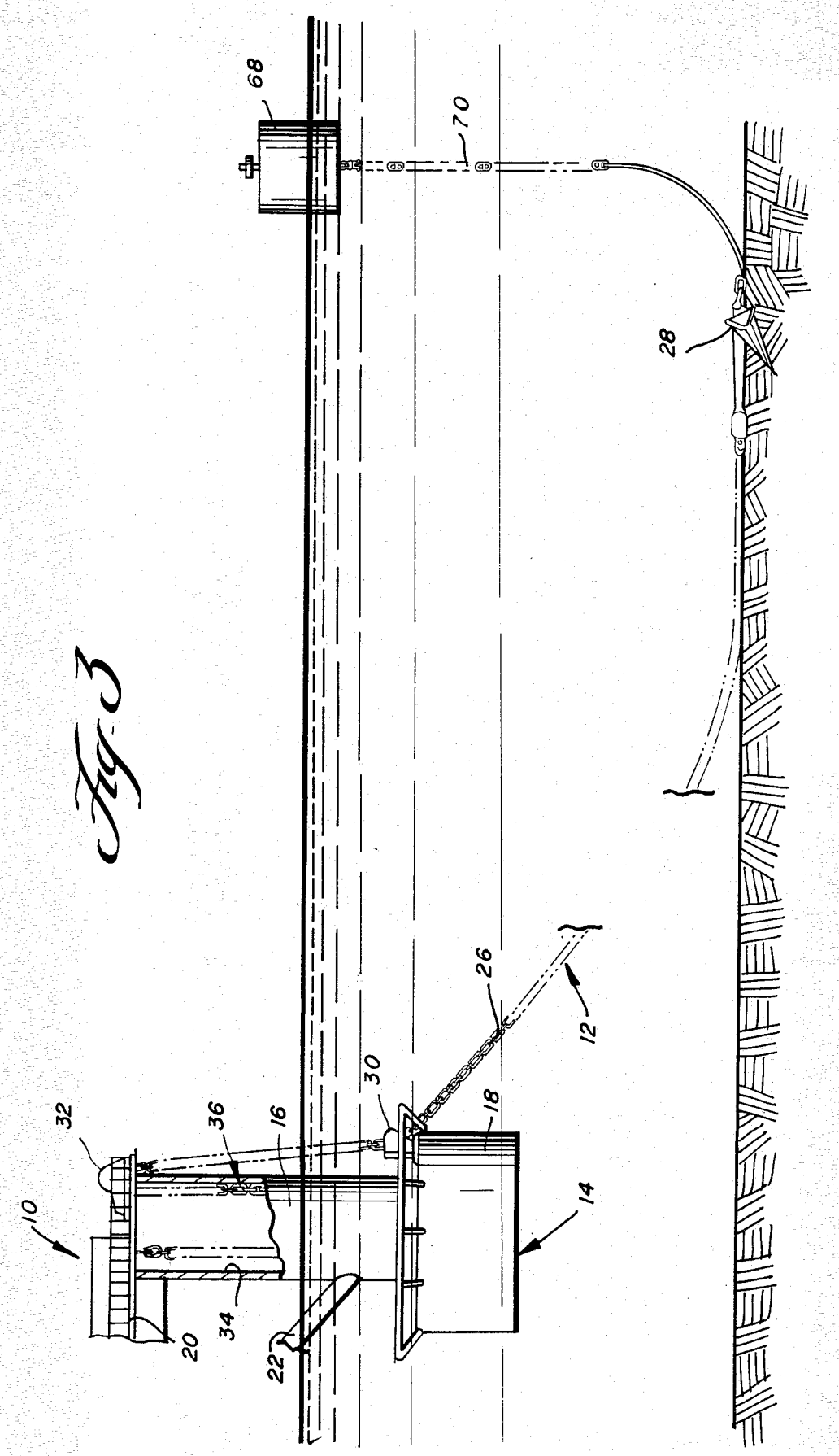

MOORING SYSTEM WITH FRANGIBLE LINKS

This application relates to mooring systems and more particularly to semi-submersible drilling rigs or the like having a mooring system capable of improved emergency disengagement.

Mooring systems of the type to which the present improvements are related consist essentially of a plurality of lengths of chain having anchors on the outboard ends thereof. The drilling rig or other instrumentality which the anchors and chains moor include chain handling mechanisms which enable the anchors to be deployed to render the system operational. Typically, each chain handling mechanism is used in conjunction with a chain locker within which the inboard end portion of the length of chain is stored. From the chain locker each chain extends in cooperative relation with an anchor windlass assembly. From the anchor windlass assembly, the chain extends in cooperating relation with a fairlead assembly. A typical semi-submersible drilling rig may involve the provision of three vertical extending tubular chain lockers which also provide flotation for rig. Each chain locker has three anchor windlass assemblies associated therewith which normally are disposed at the platform level of the rig. Three cooperating fairlead assemblies are mounted in a submersible position below the anchor windlass assemblies. The mooring system thus provides nine lengths of chain and nine anchors which are spaced peripherally outwardly from the moored position of the rig.

It is sometimes necessary where emergency conditions arise, as for example when severe storms and hurricanes are impending, to release the rig from its mooring system. When these emergency conditions arise, it is simply not practical to attempt to haul in each of the nine anchors and lengths of chain. Various somewhat complex arrangements have been proposed for quickly severing the lengths of chain extending from the fairlead assemblies to the anchors. Examples of prior art devices of this type are disclosed in U.S. Pat. Nos. 3,905,190, 4,033,277 and 4,067,282. In all of these arrangements the approach is to include a specially constructed releasable connecting device in the length of chain that is disposed outboard of the associated fairlead assembly. The releasable connecting device normally functions effectively as a connector between two links of the chain, but is operable in response to a predetermined signal to separate the two links in the chain which it serves to connect. Because the releasable connecting device must remain in the water, the problem of conveying the separating signal to the device is complicated. Moreover, the device must be self-contained and be capable of effective movement in response to the appropriate signal.

An object of the present invention is to provide emergency release capability for a mooring system of the type described which obviates the disadvantages noted above without providing offsetting disadvantages. In accordance with the principles of the present invention, this objective is obtained by providing at least one link in the length of chain which is of different construction than the remaining links, but yet is of a construction similar to the remain links such that it will move in cooperating relation through the chain handling mechanism including the anchor windlass assembly and the fairlead assembly. Each such one link includes a plurality of removably interconnected parts operable when interconnected to interengage with adjacent links of the associated length of chain. The parts of each one link include frangible portions operable to be tensioned when the one link is moved from a normal position disposed within the associated chain locker inboard of the associated anchor windlass and fairlead assemblies into a operative position outboard of the associated windlass and fairlead assemblies and a predetermined emergency load is imposed upon the portion of the length of chain extending from the associated anchor to the chain links thereof beyond the one link. The frangible portions of the one links have precision configured cross-sections calibrated to separate by material failure when the predetermined emergency load is imposed on the associated one link as aforesaid and to release the interengagement thereof with the adjacent links. The remaining links of each length of chain, including those within the portion of the length of chain between the associated one link and the associated anchor have a strength sufficient to withstand without failure loads imposed thereon greatly in excess of the predetermined emergency load.

Preferably, each one link includes a pair of similar, opposed U-shaped link parts and a pair of straight connector parts each having opposed end portions oppositely threadedly connected to one pair of corresponding legs of the opposed U-shaped link parts and a frangible portion within an associated leg intermediate the opposed end portions precisely machined to a cross-section of circular configuration.

Accordingly, another object of the present invention is the provision of an improvement in a mooring chain and anchor assembly of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIG. 2 is a somewhat schematic top plan view illustrating the drilling rig and the mooring system;

FIG. 3 is a fragmentary side elevational view with parts broken away for purposes of clearer illustration of a portion of the drilling rig and one of the mooring anchor and chain assemblies embodying the improvements of the present invention operatively connected therewith in its normal mooring position;

FIG. 4 is a top plan view of the frangible link embodying the principles of the present invention; and FIG. 5 is an enlarged fragmentary sectional view taken along the line of 5—5 of FIG. 4.

Figure 1:
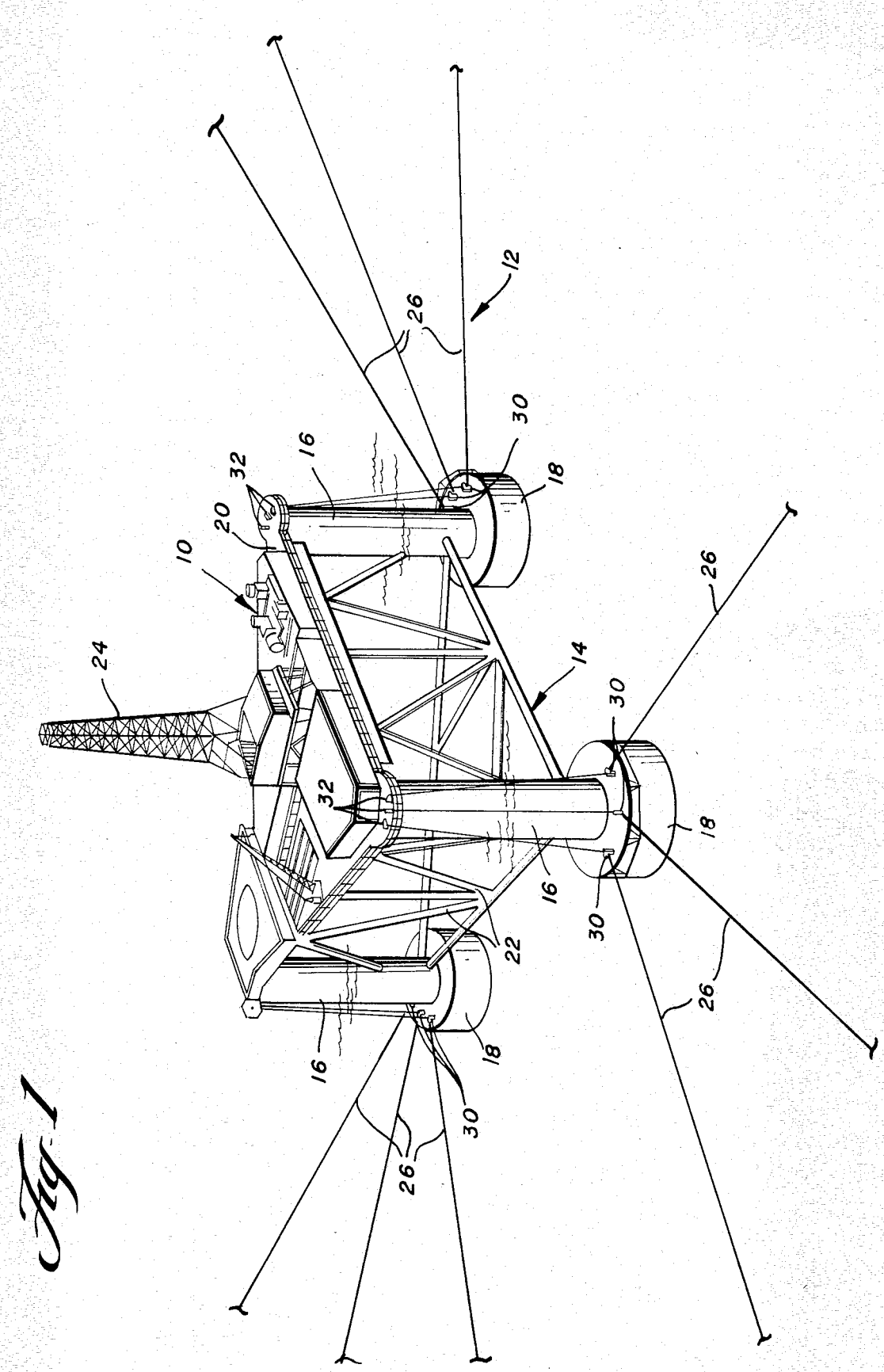
FIG. 1 is a perspective view of a semi-submersible drilling rig showing the same in operative relation within a body of water and the deployment of the chains of the mooring system thereof.

Referring more particularly to the drawings, there is shown in FIGS. 1–3 a conventional semi-submersible drilling rig, generally indicated at 10, having a mooring system, generally indicated at 12, which embodies the improvements of the present invention. The drilling rig, as shown, is of conventional triangular configuration, including a rigid frame structure, generally indicated at 14, which provides three vertical extending tubular frame members 16 each having a submerged cylindrical flotation chamber 18 on the lower end thereof. The upper ends of each of the three tubular members are fixed to three corners of an elevated drilling platform 20 forming a part of the frame structure 14. It will be understood that the frame structure 14 also includes suitable lower bracing elements 22 extending between the various tubular elements 16 and the platform 20. It will also be understood that the platform 20 is arranged to carry a derrick 24 and other components which render the rig 10 suitable for oil well drilling in accordance with conventional practice.

The mooring system 12 consists essentially of nine lengths of chain 26 having nine anchors 28 connected to the outboard ends thereof for deployment in outwardly disposed annularly spaced arrangement with respect to the rig as shown in FIG. 2. The inboard end portions of each length of chain 26 extends in cooperating relation with chain handling means provided on the rig and more specifically a fairlead assembly 30 positioned on an associated flotation chamber 18 and an anchor windlass assembly 32 on the platform structure 20 thereabove. From the anchor windlass assemble 32, each chain 26 extends into the interior of the associated tubular member 16 which constitutes a chain locker 34.

It will be understood that each length of chain 26 may be of any suitable construction. For example, a typical length of chain has an overall length of approximately 4,000 feet and is made up of 500-foot sections of three-inch oil rig quality welded stud links. Each adjacent pair of 500-foot sections are interconnected by a connecting link of conventional construction, as for example, a three-inch oil rig quality connecting link of the type manufactured and sold by Baldt, Inc. Similarly, each anchor 28 may be of any conventional construction, a typical example being a 33,000 pound high holding power moorfast anchor with 34° and 50° fluke angle adjusting blocks of the type manufactured by Baldt, Inc.

Each length of chain 26 is such that in normal operation when the associated anchor 28 is engaged within the water bottom as shown in FIG. 3, all of the links of length of chain 26 extending outboard of the windlass anchor assembly 32 and associated fairlead assembly 30 will be of conventional configuration, such as mentioned above, sufficient to move in cooperating relation through both the fairlead assembly 30 and the associated anchor windlass assembly 32.

In accordance with the principles of the present invention, within the portion of each length of chain 26 which is normally disposed inboard of the associated anchor windlass assembly 32 and within the associated chain locker 34, there is provided a frangible link generally indicated at 36, which embodies the principles of the present invention. As best shown in FIG. 4, the frangible link 36 is configured similarly to the links of the length of chain 26 in that it is configured to move in cooperating relation through the anchor windlass assembly 32 and fairlead assembly 30 in the same manner as the links of the length of chain 26. Each frangible link 36 is of a different construction with respect to the remaining links in that their construction is such that they can withstand loads in normal operating conditions which are greatly in excess of a predetermined emergency load which will cause the frangible link 36 to separate. Each frangible link 36, however, is normally disposed, as aforesaid, within the associated chain locker 34 inboard of the associated anchor windlass assembly 32 so that the normal operative loads imposed upon the portion of the chain outboard of the anchor windlass assembly and the fairlead assembly will not be imposed thereupon.

When emergency conditions arise and it is desired to disengage the mooring system 12 from the drilling rig 10, it is necessary merely to operate each anchor windlass assembly 32 so as to move the associated frangible link 36 from its normal position within the chain locker 34 inboard of the associated anchor windlass assembly 32 into a position outboard of the associated anchor windlass assembly and preferably also outboard of the associated fairlead assembly 30. When moved into this outboard relationship, loads carried by the length of chain will thus be imposed upon the frangible link 36.

Referring now more particularly to FIGS. 4 and 5, each frangible link 36 is formed of a plurality of parts which are removably interengaged so as to interconnect with adjacent links in the associated length of chain 26. As shown, the parts include two generally similar opposed U-shaped link parts 38 and 40 and a pair of straight connector parts each being generally designated by the reference number 42. As best shown in FIG. 5, each connector part includes opposite end portions 44 and 46, a calibrated intermediate frangible reduced portion 48 and an enlarged tool receiving intermediate portion 50. The end portions 44 and 46 of each connector part 42 are adapted to be connected respectively with a corresponding pair of legs of the opposed U-shaped link parts 38 and 40. As shown, the connection between each end portion 44 and the associated leg of the link part 38 is provided by an interior thread 52 formed on the wall of a bore 54 extending into the associated leg of U-shaped link part 38 from an associated end face 56 thereof. The end portion 44 of the associated connector part 42 is provided with an exterior interengaging thread 58. Each leg of the link part 40 is likewise formed with a bore 60 extending inwardly from an associated end face 62 to a depth slightly greater than the depth of the bores 54. As before, each bore 60 is interiorly threaded as indicated at 64. Thread 64 has a pitch opposite from the pitch of the interior thread 52. Correspondingly, each connector part end portion 46 is exteriorly threaded, as indicated at 66, with a thread pitch opposite from the pitch of the thread 58.

Each connector part 42 is made from the same bar stock, as for example steel. The bar stock is preferably hexagonal in cross-section so as to form the exterior peripheral configuration of the enlarged tool receiving intermediate portion 50. In this regard, it will be noted that the portion 50 provides opposite marginal end faces which, when the parts 38, 40 and 42 are properly assembled, abuttingly engage the end surfaces 56 and 62.

The calibrated intermediate frangible reduced portion 48 is machined from the bar stock with great precision and accuracy in so far as the circular cross-sectional configuration thereof is concerned. Stated differently, the diameter dimension is held to close tolerances. The bar from which the connector parts 42 are machined is calibrated by machining a test specimen of the bar to the same diameter dimension so as to determine its load failure point.

The frangible link 36 is separated by generally simultaneously turning the connector parts 42 through engagement of the portions 50 with suitable tools. The generally simultaneous turning of the tool portions 50 has the effect of moving the link parts 38 and 40 away from each other due to the opposite pitch of the threaded connections provided by the end portions 44 and 46 with the interengaging threads of the corresponding bores 54 and 60. The link is connected in operative position within the chain by engaging each link part 38 and 40 with separated end links of the length of chain. The connector parts 42 are generally simultaneously positioned between the legs of the link parts 38 and 40 and the threads are suitably aligned. By generally simultaneously turning the connector parts 42 by engaging tools with the hexagonal portions 50, the two opposed link parts 38 and 40 are moved toward one another until the end surfaces 56 and 62 engage the respective marginal end faces of the hexagonal portions 50. In this position it will be noted by viewing FIG. 5 that the frangible portions 48 are disposed within the outer end portions of the bores 60 within the link part 40.

As previously explained, in the normal operation of the drilling rig 10, the frangible link 36 associated with each length of chain 26 is interconnected with the links of the length of chain at a position such that when the length of chain 26 is operationally deployed with the associated anchor 28 in engagement with the water bottom to effectively moor the drilling rig, the associated frangible link 36 will be positioned inboard of the associated anchor windlass assembly 32 and within the associated chain locker 34. An exemplary position is illustrated in FIG. 3. When it is desired to effect emergency disengagement of the mooring system 12, each anchor windlass assembly 32 is operated to pay out the associated chain 26 until the frangible link 36 moves in cooperating relation through the anchor windlass assembly. As each frangible link 36 is moved into a position outboard of its associated anchor windlass assembly 32, it is subjected to the tensile load carried by the associated length of chain 26. It is within the contemplation of the present invention that the chain load itself could be of sufficient magnitude to provide the predetermined tensile force necessary to fracture the calibrated frangible portions 48 of each frangible link 36. Preferably, however, the predetermined fracturing tensile force is slightly greater than the chain load itself so as to require the imposition of an additional load, as, for example, a positively directed moving force on the rig 10, such as a tug or motor drive thereof. Preferably, the deployment of the frangible links 36 is not only outboard of the associated anchor windlass assemblies 32 but outboard of the associated fairlead assemblies 30 as well. In the preferred embodiment, the semi-submerged rig 10 is powered to move so as to apply successive predetermined emergency loads to successive lengths of chain so as to successively fracture the outboard deployed frangible links 36 thereof.

In accordance with the principles of the invention, since under emergency conditions a number of extensive lengths of chain 26 and attached anchors 28 will be left in the water bottom, it is preferable to provide a locating buoy 68 for locating each anchor and chain assembly. As shown, each locating buoy 68 is connected with the associated anchor 28, as by a line or length of chain 70 connected at one end to the buoy and at its other end to the associated anchor 28. With this arrangement it will be understood that after the mooring system 12 has been released and the rig 10 moved to a safe location, the mooring system 12 can be retrieved simply by locating the buoys 68 and then retrieving the anchors 28 and attached lengths of chain 26 by hauling in the lines 70.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In a semi-submersible drilling rig or the like having a plurality of chain lockers, a plurality of anchor windlass assemblies and a plurality of fairlead assemblies, a plurality of lengths of chain each having a multiplicity of interconnected links configured to move from a chain locker in cooperative relation through an associated anchor windlass assembly and an associated fairlead assembly, an anchor for each length of chain, and means connecting each anchor to the end of the associated length of chain outboard of the associated fairlead assembly so as to engage with the water bottom, the improvement which comprises each of said lengths of chain having at least one link normally disposed within the associated chain locker inboard of the associated anchor windlass and fairlead assemblies of a different construction with respect to the remaining links of the associated length of chain, each one link including a plurality of removably interconnected parts operable when interconnected to interengage with the adjacent links of the associated length of chain, the parts of each one link including frangible means operable to be tensioned when said one link is moved outboard of the associated anchor windlass and fairlead assemblies and a predetermined emergency load is imposed upon the portion of said length of chain extending from said anchor to the links thereof beyond said one link, the frangible means of each one link having precision configured cross-section calibrated to separate by material failure when said predetermined emergency load is imposed on the associated one link as aforesaid, and release the interengagement thereof with the adjacent links, the remaining links of each length of chain including those within the portion of the length of chain between the associated one link and the associated anchor having a strength sufficient to withstand without failure loads imposed thereon greatly in excess of said predetermined emergency load.

2. The improvement as defined in claim 1 wherein each length of chain and associated anchor has a buoy associated therein for locating the anchor and length of chain in the event of a failure of the frangible means of the associated one link in response to the imposition of said predetermined emergency load thereon, and a line connected with said buoy and operatively connected with respect to the associated anchor for retrieving the anchor and length of chain after failure of the associated one link as aforesaid.

3. The improvement as defined in claim 2 wherein the parts of each one link include a pair of similar, opposed U-shaped link parts and a pair of straight connector parts each having opposed end portions connected to one pair of corresponding legs of said opposed U-shaped link parts and a frangible portion intermediate the opposed end portions thereof precisely machined to a cross-section of circular configuration.

4. The improvement as defined in claim 3 wherein each frangible portion is disposed within an associated leg of one of the associated U-shaped link parts.

5. The improvement as defined in claim 4 wherein the opposed end portions of each connector part are formed with oppositely pitched exterior screw threads and each associated one pair of corresponding legs of U-shaped link parts are formed with interengaging interior threads of opposite pitch.

6. The improvement as defined in claim 5 wherein each connector part includes a tool engaging portion adjacent the frangible portion thereof, each tool receiving portion having a polygonal cross-section of greater area than the area of the circular cross-section of the associated frangible portion.

7. The improvement as defined in claim 6 wherein each of said tool receiving portions is of enlarged hexagonal cross-sectional configuration defining opposed outer marginal faces disposed in engagement with the end surfaces of the legs within which the associated connector part is threadedly engaged.

8. The improvement as defined in claim 1 wherein the parts of each one link include a pair of similar, opposed U-shaped link parts and a pair of straight connector parts each having opposed end portions connected to one pair of corresponding legs of said opposed U-shaped link parts and a frangible portion intermediate the opposed end portions thereof precisely machined to a cross-section of circular configuration.

9. The improvement as defined in claim 8 wherein each frangible portion is disposed within an associated leg of one of the associated U-shaped link parts.

10. The improvement as defined in claim 9 wherein the opposed end portions of each connector part are formed with oppositely pitched exterior screw threads and each associated one pair of corresponding legs of U-shaped link parts are formed with interengaging interior threads of opposite pitch.

11. The improvement as defined in claim 10 wherein each connector part includes a tool engaging portion adjacent the frangible portion thereof, each tool receiving portion having a polygonal cross-section of greater area than the area of the circular cross-section of the associated frangible portion.

12. The improvement as defined in claim 11 wherein each of said tool receiving portions is of enlarged hexagonal cross-sectional configuration defining opposed outer marginal faces disposed in engagement with the end surfaces of the legs within which the associated connector part is threadedly engaged.

13. In a mooring assembly for a semi-submersible drilling rig or the like comprising a length of chain, an anchor, and means connecting said anchor to one end of said length of chain, said length of chain being sufficient to extend from a chain locker of the rig through the chain handling means of the rig to a remote anchor position where said anchor is to be engaged with the water bottom, the improvement which comprises said length of chain including a multiplicity of interconnected links all of which are configured to move from the chain locker through the associated chain handling means and at least one of which is of different construction with respect to the remaining links, said one link including a plurality of removably interconnected parts operable when interconnected to interengage with the adjacent links of said length of chain, said parts including frangible means operable to be tensioned when said one link is moved from a normal position inboard of said chain handling means to a position outboard thereof and a predetermined emergency load is imposed upon the portion of said length of chain extending from said anchor to the links thereof beyond said one link, the frangible means of said one link having precision configured cross-section calibrated to separate by material failure when said predetermined emergency load is imposed on said one link as aforesaid and release the interengagement thereof with the adjacent links, the remaining links of said length of chain including those within the portion of the length of chain between the associated one link and the associated anchor having a strength sufficient to withstand without failure loads imposed thereon greatly in excess of said predetermined emergency load.

14. The improvement as defined in claim 13 wherein said parts include a pair of similar opposed U-shaped link parts and a pair of straight connector parts each having an opposed end portion connected to one pair of corresponding legs of said opposed U-shaped link parts and a frangible portion intermediate the opposed end portions thereof precisely machined to a cross-section of circular configuration.

15. The improvement as defined in claim 14 wherein each frangible portion is disposed within an associated leg of one of said U-shaped link parts.

16. The improvement as defined in claim 15 wherein the opposed end portions of each connector part are formed with oppositely pitched exterior screw threads and each associated one pair of corresponding legs of said U-shaped link parts are formed with interengaging interior threads of opposite pitch.

17. The improvement as defined in claim 16 wherein each connector part includes a tool engaging portion adjacent the frangible portion thereof, said tool receiving portion having a polygonal cross-section of greater area than the area of the circular cross-section of the associated frangible portion.

18. The improvement as defined in claim 18 wherein each of said tool receiving portions is of enlarged hexagonal cross-sectional configuration defining opposed outer marginal faces disposed in engagement with the end surfaces of the legs within which the associated connector part is threadedly engaged.

19. The improvement as defined in claim 13 wherein said length of chain and anchor have a buoy associated therewith for locating the anchor and length of chain in the event of a failure of the frangible means of said one link in response to the imposition of said predetermined emergency load thereon, and a line connected with said buoy and operatively connected with respect to the anchor for retrieving the anchor and length of chain after failure of said one link as aforesaid.

* * * * *